US012523364B2

(12) United States Patent
Block

(10) Patent No.: US 12,523,364 B2
(45) Date of Patent: Jan. 13, 2026

(54) LIGHTING SYSTEM INCLUDING MOUNTING RAIL WITH AN INTEGRATED WAVEGUIDE

(71) Applicant: Zumtobel Lighting GmbH, Dornbirn (AT)

(72) Inventor: Steffen Block, Hörbranz (AT)

(73) Assignee: Zumtobel Lighting GmbH, Dornbirn (AT)

(*) Notice: Subject to any disclaimer, the term of this patent is extended or adjusted under 35 U.S.C. 154(b) by 0 days.

(21) Appl. No.: 18/852,728

(22) PCT Filed: Apr. 24, 2023

(86) PCT No.: PCT/EP2023/060604
§ 371 (c)(1),
(2) Date: Sep. 30, 2024

(87) PCT Pub. No.: WO2023/208819
PCT Pub. Date: Nov. 2, 2023

(65) Prior Publication Data

US 2025/0216064 A1 Jul. 3, 2025

(30) Foreign Application Priority Data

Apr. 29, 2022 (EP) .................................... 22170730

(51) Int. Cl.
*F21V 23/00* (2015.01)
*F21V 21/34* (2006.01)
(Continued)

(52) U.S. Cl.
CPC .......... *F21V 23/0435* (2013.01); *F21V 21/34* (2013.01); *H01Q 1/22* (2013.01); *H05B 47/19* (2020.01); *H05B 47/1965* (2024.01)

(58) Field of Classification Search
CPC ..... F21V 23/0435; F21V 21/34; H05B 47/19; H01Q 1/22
See application file for complete search history.

(56) References Cited

U.S. PATENT DOCUMENTS 7,606,592 B2 * 10/2009 Becker ...................... H01P 5/18 330/95
10,578,689 B2 * 3/2020 Anderson ............ G01R 33/422
2015/0316238 A1 11/2015 Guilmette

FOREIGN PATENT DOCUMENTS

EP 3700306 A1 8/2020
EP 3772238 A1 2/2021
WO 2021004981 A1 1/2021

OTHER PUBLICATIONS

PCT/EP2023/060604, International Search Report and Written Opinion dated Jun. 23, 2023, 12 pages.

* cited by examiner

*Primary Examiner* — Gerald J Sufleta, II
(74) *Attorney, Agent, or Firm* — Andrus Intellectual Property Law, LLP

(57) ABSTRACT

The invention concerns a lighting system comprising a mounting rail assembly comprising conductors for mains supply integrated into the mounting rail assembly, and mechanical mounting fixtures for lighting modules, lighting control modules and/or other system modules, and a first wireless node module attached to the mounting rail assembly. The mounting rail assembly comprises at least one second wireless node module attached to the mounting rail assembly. The mounting rail assembly comprises a waveguide configured to guide wireless signals between the first wireless node module and the at least one second wireless node module.

10 Claims, 7 Drawing Sheets

(51) Int. Cl.

| | |
|---|---|
| ***F21V 23/04*** | (2006.01) |
| ***H01Q 1/22*** | (2006.01) |
| ***H05B 47/19*** | (2020.01) |
| *H05B 47/175* | (2020.01) |

LIGHTING SYSTEM INCLUDING MOUNTING RAIL WITH AN INTEGRATED WAVEGUIDE

CROSS-REFERENCE TO RELATED APPLICATION

The present application is the U.S. national stage application of international application PCT/EP2023/060604 filed Apr. 24, 2023, which international application was published on Nov. 2, 2023 as International Publication WO 2023/208819 A1. The international application claims priority to European Patent Application No. 22170730.0, filed Apr. 29, 2022.

TECHNICAL FIELD OF THE INVENTION

The invention relates to the field of lighting systems, in particular to a lighting system with the capability to transmit radio signals between individual components of the lighting system and wireless devices in the environment of the lighting system.

BACKGROUND OF THE INVENTION

Lighting systems comprise a plurality of individual components including luminaires and control devices for controlling operation of the luminaires. Apart from a conventional mains wiring of the individual components, the components of the lighting system may communicate control and status signals via a communication network of the lighting system. The communication network may either use a wired connection between the individual components, or require establishing a wireless network for linking the components of the lighting system.

Establishing a wireless network for an indoor lighting system poses diverse challenges. The use scenarios for rooms may change over time, and the varying furniture and locations of furniture change propagation properties of the radio waves in the environment due to reflexion at surfaces. Reflexion of radio waves may not be usable at all for achieving a desired radio coverage in case of high ceilings, e.g. as found in many buildings in the logistics or manufacturing sectors.

Generally, availability of a wireless connection decreases disproportionally when increasing a distance between a wireless transmitter and the receiver. As regulations often restrict the transmission power of the wireless transmitter, a characteristic range for a line-of-sight wireless radio connection of typical indoor communication systems ends at about 15 m. Bridging distances in excess of 15 m requires use of a radio repeater. However, a radio repeater includes radio reception and transmission circuitry, requires power supply, and thus increases cost for hardware and installation significantly. Each radio repeater further introduces a transmission delay for receiving and retransmitting the wireless signal. In case of using plural radio repeaters for bridging distances of 50 m to 70 m in a typical manufacturing environment, warehouse or food retailer building, the added time delays of the cascaded radio repeaters become significant.

Another aspect of installing radio communication, and in particular indoor radio communication, concerns mutual interference between different wireless systems operating in close vicinity. For example, a WLAN communication network and the light communication network operate in a same environment, only some metres apart, and may therefore adversely affect each other. Avoiding mutual interference requires careful network planning and maintaining minimum distances and maximum transmission power for transmitters for the individual radio devices of the different systems.

Another aspect worth considering concerns availability of the lighting system and the wireless network linking the components of the lighting system. A mesh network topology of the wireless network is preferable, as a breakdown of one radio repeater or a communication module in a luminaire linking two portions of the lighting network may result in the lighting system disintegrating into two separate partial lighting systems, and, depending on the system topology, thereby losing at least some functionalities of the lighting system. Although implementing the wireless network in a mesh network topology is desirable for achieving a stable communication between the individual components of the lighting system, the required large number of radio nodes, the increased commissioning effort for the large number of radio nodes for the radio mesh network is disadvantageous from a cost point of view. This cost involved for implementing the mesh network topology is disadvantageous in particular in case of light systems designed for low cost applications.

EP 3 700 306 A1 discloses a mounting rail in a lighting system, the mounting rail carrying luminaires and other devices of the lighting system. The lighting system comprises a transmitter for sending a radio signal and the mounting rail comprises at least one waveguide for transmitting the radio signal output by the transmitter to components of the lighting system and other recipients, e.g. wireless devices including smartphones for an indoor navigation application.

SUMMARY OF THE INVENTION

Therefore, it is an object of the invention to provide lighting systems with an improved capability to form a lighting network overcoming the aforementioned disadvantages.

In a first aspect, the lighting system according to independent claim 1 solves the aforementioned problem. The dependent claims define further advantageous features of the lighting system In the first aspect, the lighting system comprises a mounting rail assembly that comprises conductors for mains supply integrated into the mounting rail assembly and mechanical mounting fixtures for lighting modules and/or lighting control modules, and/or other system modules, and a first wireless node module arranged at the mounting rail assembly. The mounting rail assembly comprises at least one second wireless node module attached to the mounting rail assembly. The mounting rail assembly comprises a waveguide configured to guide wireless signals between the first wireless node module and the at least one second wireless node module.

The waveguide is a mechanical device, with high robustness against mechanical effects.

The waveguide is also a passive electrical component, which consumes no electrical power.

The waveguide transfers radio signals shielded against external electromagnetic interference and also exerts no electromagnetic interference to other applications using radio waves or susceptible to radio waves in the neighbouring environment.

Thus, the waveguide is advantageous in terms of equipment cost, installation cost, energy consumption and electromagnetic interference characteristics compared to the use of radio repeaters according to prior art.

The mounting rail assembly may comprise the at least one second wireless node module attached to the mounting rail assembly at a distance from the first wireless node module exceeding a radio range of the first and/or second wireless node module. Given this case, currently at least one radio repeater is to be arranged at the mounting assembly in order to enable a radio link between the first radio node device and the at least one further radio node device. Preferably, in order to achieve a robust radio link, two radio repeaters would have to installed between the first node device and the neighbouring second node device in order to add a redundancy by reducing the distance between the wireless node devices and the radio repeaters to less than half the maximum range. Then, in case one radio repeater fails, the failing radio repeater may be bypassed. Contrary thereto, he claimed lighting system uses instead one waveguide for providing a wireless connection between the first node device and the neighbouring second node device. The passive electric component waveguide offers a robust connection less prone to malfunction than the active electric component radio repeater comprising a radio receiver and a radio transmitter.

The dependent claims define further advantageous embodiments of the invention.

The lighting system according to an embodiment provides the waveguide integrally with the mounting rail assembly.

The mounting rail assembly itself may be a metal tubular design, which is well suited to integrate at least parts of a waveguide consisting of a conducting material and made in a same manufacturing technology. This provides advantageous manufacturing characteristics for the integrated design.

The lighting system may have the waveguide including at least one detachable element designed to be provided separate from the mounting rail assembly.

This provides a modular system layout suited for on-site improvement, and also well suited for defining advantageous business models based on the modular system layout.

According to one embodiment of the lighting system, the waveguide includes at least one detachable element configured to be provided separate from the mounting rail assembly. The at least one detachable element is essentially planar and configured to be inserted into an interior of the mounting rail assembly for forming the waveguide in combination with lateral wall sections of the mounting rail assembly.

This modular system layout is suited for on-site improvement, and has low manufacturing cost.

The waveguide of an embodiment of the lighting system is configured to include at least two detachable elements configured to be attached on an outer wall of the mounting rail assembly.

The waveguide may include holes configured to pass pendant cords hanging the mounting rail assembly below a ceiling.

Thus, the resulting system design is suited for large rooms with high ceilings by suspending the mounting rail assembly from the ceiling.

The lighting system according to an embodiment includes the mounting rail assembly having an essentially U-shaped cross section.

The U-shaped cross section offers high rigidity, low weight and plenty of surfaces for adding additional modules within the interior of the U-shape and externally to the U-shape.

The waveguide of the lighting system may comprise at least one terminating element arranged at an end portion of the waveguide, wherein the at least one terminating element is configured to attenuate electromagnetic waves.

This embodiment avoids reflexions at the ends of the waveguide and therefore suppresses destructive interference of electromagnetic waves inside the waveguide. The terminating element may comprise, for example, a termination resistor, a circuit comprising resistors whose impedance matches an impedance of the waveguide, or more generally, an attenuator element with a high signal attenuation.

The lighting system according to one embodiment has the waveguide comprising at least one pre-fabricated aperture for electromagnetically connecting the first wireless node module and the at least one second wireless node module arranged at the waveguide.

The at least one aperture measures into at least one dimension half a wavelength of the wireless signals.

Thus, the wireless signals incite propagation modes of electromagnetic waves inside the waveguide. Alternatively, the aperture acts as slot antenna radiating wireless signals when being fed by the propagation modes of electromagnetic waves inside the waveguide.

The lighting system may include the first wireless node module and the at least one second wireless node module each comprising at least one antenna, wherein the at least one antenna is located essentially at the aperture of the waveguide for radiating and receiving at least a portion of the wireless signals through the aperture into the waveguide.

Thus, an efficient transfer of the wireless signals and the electromagnetic waves inside the waveguide is achieved.

The lighting system according to one particular embodiment includes at least one of the first wireless node module and the at least one second wireless node module comprising an antenna array. At least one first antenna element of the antenna array is configured to transmit and to receive wireless signals though the aperture into the waveguide, and the at least one second antenna element is configured to transmit and receive the wireless signals from predetermined directions in the environment of the mounting rail assembly.

Thus, the antenna elements may be optimized separately for the purposes of coupling wireless signals to the waveguide on the one hand, and communicating with other wireless devices in the environment of the lighting system within range of the first wireless node module and the at least one second wireless node module. This offers advantageous design options to a design engineer and reduces cost for designing the system.

BRIEF DESCRIPTION OF THE DRAWINGS

The subsequent discussion of embodiments of the lighting system and the mounting rail assembly refers to the figures, in which FIG. 1 provides an overview of a mounting rail assembly in a lighting system according to the first aspect.

DETAILED DESCRIPTION OF THE EXEMPLARY EMBODIMENT

In the figures, corresponding elements have the same reference signs. The discussion of the figures avoids discussion of same reference signs in different figures wherever considered possible without adversely affecting comprehensibility and avoiding unnecessary repetitions for sake of conciseness. The proportions and dimensions of the elements shown in the figures do not represent the respective devices and application scenarios to scale, but are merely chosen to describe the structure and function of the lighting system and its components.

All steps which are performed by the various entities described in the present disclosure as well as the functionalities described to be performed by the various entities are intended to mean that the respective entity is adapted to or configured to perform the respective steps and functionalities. In the claims as well as in the description the word "comprising" does not exclude the presence of other elements or steps.

The indefinite article "a" or "an" does not exclude a plurality. A single element or other unit may fulfill the functions of several entities or items recited in the claims. The mere fact that different dependent claims recite certain measures and features of the converter circuit does not exclude that a combination of these measures and features cannot combined in an advantageous implementation.

The discussion uses the term radio signal or wireless signal interchangeably. Radio signal or wireless signal may refer to a control signal or a status signal, which is transmitted between components of the lighting system. The radio signal can be a sensor signal, which a sensor of the lighting system provides. The radio signal can be a communication signal that is unrelated to the lighting system, e.g. a radio communication signal that encodes an audio signal, a video signal or an indoor navigation signal.

The radio signal may be an unidirectional signal or a bidirectional signal.

The lighting system may include other components than luminaires, e.g. a sensor for determining an ambient light level, a temperature, a humidity, for detecting gas or presence of persons in a detection area of the sensor. The sensor may include an integrated transmitter, receiver or a transceiver for generating and/or receiving radio signals.

The lighting system may include components such as control devices for controlling operation of the lighting system and/or configuring the lighting system. Control devices may include a light switch, a dimmer, a light server and a commissioning device.

The term gateway denotes of networking device comprising hardware and/or software used in telecommunication networks that enables data to proceed from one discrete network to another. Gateways communicate using more than one network protocol to connect multiple networks. Gateways may operate at any of the seven layers of the open systems interconnection model (OSI).

Figure 1:
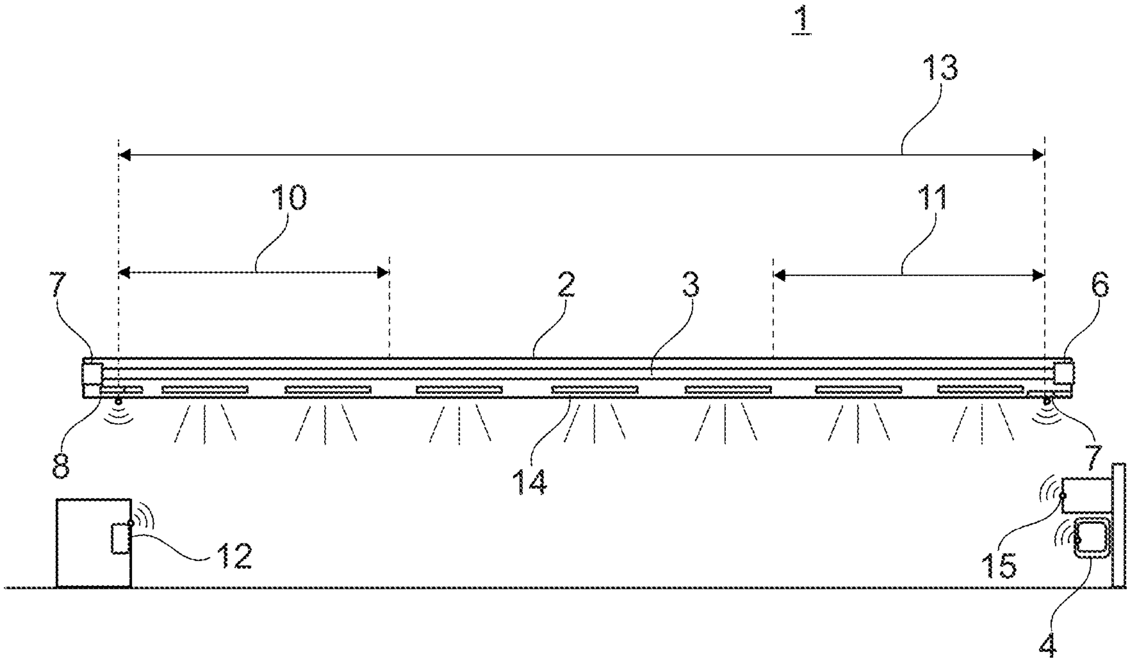

FIG. 1 provides an overview of a mounting rail assembly 2 in a lighting system 1 according to the first aspect.

The lighting system 1 may be an indoor lighting solution suspended below a ceiling in a large room or hall area. FIG. 1 dispenses with displaying the suspension 16 for the mounting rail assembly 2, which may include cords, chains or rods for suspending the mounting rail assembly from a ceiling or mast structure, for example.

The mounting rail assembly 2 may be made of sheet metal bent into a beam-like structure or a tubular structure with a generally U-shaped cross section.

Alternatively, the mounting rail assembly 2 may be a casting structure or a welded structure.

The mounting rail assembly 2 may be a plastic structure, preferably a plastic structure having a metal coating.

The length of the mounting rail assembly 2 may reach 50 to 70 m or even beyond these figures in case of large warehouses of the logistics sector or manufacturing plants. The lighting system 1 may arrange a plurality of mounting rail assemblies 2 in parallel or angled to the single mounting rail assembly 2 depicted in FIG. 1.

The mounting rail assembly 2 may comprise a plurality of mounting rail sections, which are coupled at their respective ends to form the mounting rail assembly 2.

The mounting rail assembly 2 has internally or externally arranged fastening means for attaching luminaires 14 to the mounting rail assembly 2. The mounting rail assembly 2 of FIG. 1 arranges a plurality of luminaires 14 spaced apart inside the mounting rail assembly 2, preferably towards a side of the mounting rail assembly 2 that faces the ground. Each luminaire 14 may illuminate an area directly below the luminaire 14.

Additionally or alternatively, the lighting system 1 may arrange other types of luminaires 14 at the mounting rail assembly 2, e.g. spotlights, emergency lights, or emergency escape route signs, which may be illuminated.

Additionally or alternatively, the mounting rail assembly 2 may attach other building infrastructure devices, e.g. sensor modules, in particular presence detecting sensors, temperature sensors, or ambient light level sensors.

Not shown in FIG. 1 are electrical cables or lines for mains power supply and/or communication arranged inside or attached to the mounting rail assembly 2. The electrical lines may include power supply lines for the luminaires 14 attached to the mounting rail assembly 2.

The lighting system 1 of FIG. 1 further comprises a light controller 15 for controlling the luminaires 14. The light controller 15 may be arranged at the mounting rail assembly 2 (light controller module) or separate from the mounting rail assembly 2 as shown in FIG. 1. The light controller 15 may provide control signals to the luminaires 14 and receives status signals from the luminaires 14. The light controller 15 may receive signals from control devices, e.g. switches or dimmers, or sensor devices.

The light controller 15 may communicate with devices of the lighting system 1, in particular the luminaires 14 and control devices using wired and/or wireless communication. FIG. 1 illustrates the application case that the light controller 15 implements wireless communication with the devices of the lighting system 1.

The mounting rail assembly 2 of FIG. 1 arranges a first wireless node module 7 and one second wireless node module 8 spaced apart at a distance 13 between the wireless node modules 7, 8.

The mounting rail assembly 2 may mount a plurality of second wireless node modules 8.

The first wireless node module 7 and the second wireless node module 8 may include a radio transmitter and a radio receiver, or a transceiver operating according to at least one communication standard, e.g. WLAN (IEEE 802.11), WiFi®, WPAN (IEEE 802.15), Bluetooth®, or ZigBee®.

The first wireless node module 7 and the second wireless node module 8 may operate using UHF radio waves in the ISM band from 2.402 to 2.48 GHz.

The radiated transmission power of the first wireless node module 7 and the second wireless node module 8 may be restricted to 2.5 mW in a specific example.

Alternatively, the first wireless node module 7 and the second wireless node module 8 may operate using radio waves in the ISM bands from 2.402 to 2.48 GHZ, 902 to 928 MHz, and 868 to 868.6 MHz. The radiated transmission power of the first wireless node module 7 and the second wireless node module 8 may be restricted to 100 mW by regulation in another specific example.

The first wireless node module 7 and the second wireless node module 8 may each include at least one antenna 18 or antenna array. The at least one antenna 18 may arranged at the respective first wireless node module 7 and the second wireless node module 8 such that wireless signals may be transmitted into the environment of the respective first wireless node module 7 and the second wireless node module 8. In particular, the at least one antenna 18 may transmit and receive wireless signals into the free space around, and in particular into an area below the mounting rail assembly 2.

In particular, the first wireless node module 7 and the second wireless node module 8 may operate implementing lighting control of the lighting system 1 according to one of the DALI® series standards.

The first wireless node module 6 has a wireless range 11 (radio range 11). The second wireless node module 7 has a wireless range 12 (radio range 12).

The wireless range 11 and the wireless range 12 may be up to 15 m in direct, e.g. line-of-sight, communication in free space. The wireless range 11 and the wireless range 12 may vary, and be significantly lower in case of indoor radio applications due to fading effects resulting from multipath propagation. Multipath propagation may result from superposition of wireless signals travelling along different propagation paths between transmitter and receiver due to reflections at walls, floors or furniture.

The distance 13 between the first wireless node module 7 and the second wireless node module 8 exceeds both the wireless range 10 and the wireless range 11. Thus, direct wireless communication between the first wireless node module 7 and the second wireless node module 8 is not possible in the scenario of FIG. 1.

The first wireless node module 7 may enable communication via radio signals with a control device for the lighting system. The control device may be a switch 4 for switching the lighting system on or off in a simple application scenario. FIG. 1 illustrates the switch 4 in a wireless range 11 of the first wireless node module 7.

The second wireless node module 8 may enable communication via radio signals with a mobile device 12 of a user also performing as a control device for the lighting system 1. The second wireless node module 8 may enable the mobile device 12 running an application software to switch the lighting system 1 on (illuminating the environment) or off (luminaires 14 do not emit light) in the simple application scenario. This requires relaying control signals from the switch 4 or the mobile device 12 for switching the lighting on or off to the light controller 15.

The mounting rail assembly 2 further includes a waveguide 3. The waveguide 3 of FIG. 1 is arranged interior to the mounting rail assembly 2. FIGS. 2 to 7 show particular configurations of the mounting rail assembly 2 and the waveguide 3 using cross sectional views of the mounting rail assembly 2.

The waveguide 3 may have an essentially rectangular cross section.

Alternatively, the waveguide 3 may have an essentially circular cross section or elliptical cross section.

Thus, the waveguide 3 may implement a waveguide as a specific example of a waveguide under the respective IEC standards and have the respective technical characteristics, in particular with respect to propagation of electromagnetic waves, frequency bands of operation, modes of propagation and inner dimensions of the waveguide opening.

The waveguide 3 is a closed electromagnetic waveguide, which is essentially tubular, e.g. with an essentially rectangular cross section, which has electrically conducting walls, e.g. made of sheet metal, and which is hollow or filled with a dielectric material. The waveguide 3 can support a large number of discrete propagation modes for electromagnetic waves, generally only some modes are used. Each discrete propagation mode defines the propagation constant for that propagation mode. The electromagnetic field of the radio signal transmitted in the waveguide 3 is guided inside the waveguide 3, describable in terms of the supported propagation modes, and important in present circumstances, there is no radiation field. Discontinuities and bends of the waveguide may cause mode conversion but not leakage radiation to the exterior of the waveguide.

The waveguide 3 of FIG. 1 includes a first attenuator 6 at a first end and a second attenuator 7 at a second end of the waveguide 3 opposite to the first end. The first attenuator 6 and the second attenuator 7 have an impedance matched to an impedance of the waveguide 2 and avoids reflecting electromagnetic waves at the ends of the waveguide 3. The first attenuator 6 at the first end and the second attenuator 7 perform as termination elements.

The waveguide 3 comprises apertures at positions near the first wireless node module 7 and the second wireless node module 8.

In particular, the waveguide 3 has a first aperture at the positon of the first wireless node module 7. The first wireless node module 7 is arranged such with respect to the first aperture, that a portion of the radiated electromagnetic waves of the radio signal emitted by the antenna 18 of the first wireless node module 7 is coupled into the waveguide 3. Respectively, the first aperture is arranged such in the waveguide 3, that the first aperture acts a slot antenna radiating electromagnetic waves of a radio signal in the waveguide 3 to the antenna 18 of the first wireless node module 7.

The waveguide 3 has a second aperture at the positon of the second wireless node module 8. The second wireless node module 8 is arranged such with respect to the second aperture, that a portion of the radiated electromagnetic waves of the radio signal emitted by the antenna 18 of the second wireless node module 8 is coupled into the waveguide 3. Respectively, the second aperture is arranged such in the waveguide 3, that the second aperture acts a slot antenna radiating electromagnetic waves of a radio signal in the waveguide 3 to the antenna 18 of the second wireless node module 8.

The first aperture and the second aperture may have a dimension corresponding to $\lambda/2$, wherein $\lambda$ is the wavelength corresponding to a transmission frequency $f_c$ of the radio signal used by the first wireless node module 7 and the second wireless node module 8.

Thereby, the waveguide 3 enables transmission of radio signal between the first wireless node module 7 and the second wireless node module 8. The radio signals may include at least one of control signals for controlling the lighting system 1, status signals of components of the lighting system 1, and communication signals between communication counterparts in the environment, in which the lighting system 1 is installed.

The waveguide 3 enables reliable communication via wireless signals over large distances, for example 40 m over a hallway, without requiring procurement, installation and commissioning of a series of wireless repeaters between distant locations along the hallway.

The waveguide 3 enables designing modular and scalable lighting systems 1, which are supplemented by additional control devices or additional mounting rail assemblies 2, by adding further apertures, and further second wireless node modules 8 at large distances, which would currently require adding wireless repeaters.

The communication between the elements of the lighting system 1 is particularly reliable due to using the waveguide 3, which shields the wireless signals within the waveguide 3 from electromagnetic interference, for example from working machines in a manufacturing environment or climate control equipment.

The signal to noise ratio SNR for the received wireless signal from the waveguide 3 is advantageously high due to the reduced influence of other radio signals usually present in the contemporary environment.

Furthermore, implementing the communication via wireless signals using the waveguide 3 over large distances reduces the power consumption significantly due to the directed transmission of electromagnetic energy in the passive waveguide 3 instead of the active reception and retransmission of the wireless signals by radio repeaters.

The waveguide 3 represents a closed transmission medium for the wireless signal, which reduces an electromagnetic interference by the wireless signals towards other electric devices in the neighborhood of the lighting system 1. Thus, the lighting system 1 including the mounting rail assembly 2 is employed advantageously in sensitive application scenarios e.g. in hospitals or research institutions.

The waveguide 3 transmits wireless signals and therefore information modulated onto the wireless signals with a group velocity of the electromagnetic wave within the waveguide 3. The lighting system 1 dispenses with the additional time delay introduced by each radio repeater due to receiving and re-transmitting the wireless signal in the conventional solution for modular lighting systems usually relying on wireless signals in a lighting control network.

Figure 2:
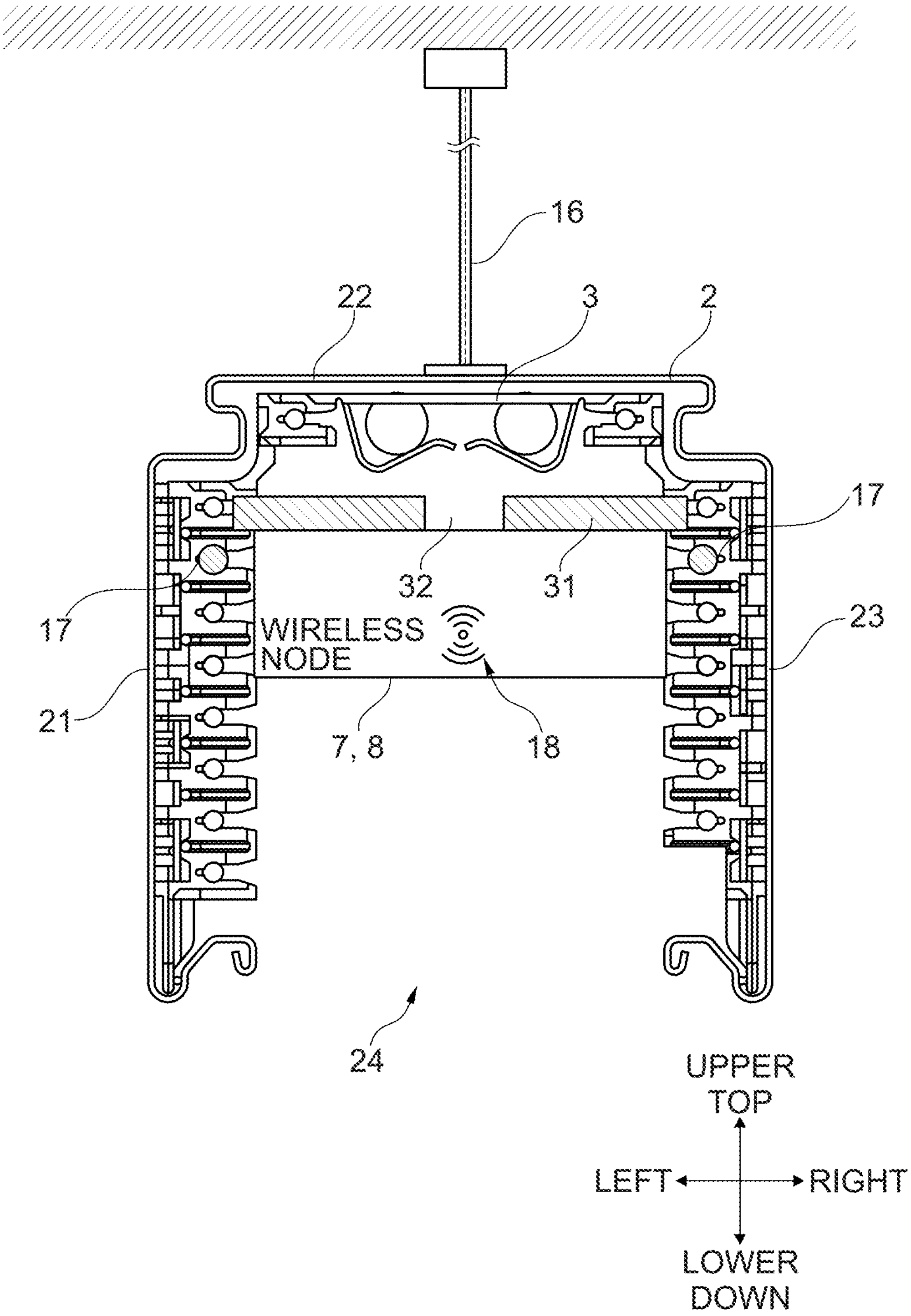
FIG. 2 shows a cross sectional view of a mounting rail assembly of a first embodiment.

FIG. 2 shows a cross sectional view of a mounting rail assembly 2 of a first embodiment.

The depicted mounting rail assembly 2 is arranged below a ceiling by hanging on a (mechanical) suspension 16. The mechanical suspension 16 may include a cord, a wire, a chain or a rod for suspending the mounting rail assembly 2.

The mounting rail assembly 2 has an essentially U-shaped cross section. The mounting rail assembly 2 may be made from electrically conducting sheet metal by applying a bending process or a stamping process.

The mounting rail assembly 2 comprises a first side wall 21 (left side wall 21), a second side wall 22 (right side wall 23) essentially parallel to the first side wall 21, and a top wall 22 linking the first side wall 21 and the second side wall 23 at an approximately right angle. The first side wall 21, the top wall 22, and the second side wall 23 enclose an interior of the mounting rail assembly 2, which is open to the exterior environment of the mounting rail assembly 2 via a lower opening 24 (opening 24).

The first side wall 21, the top wall 22, and the second side wall 23 are outer walls of the mounting rail assembly 2 separating the interior of the mounting rail assembly 2 from the exterior of the mounting rail assembly 2.

At an interior side (surface) of the outer walls 21, 22, 23 of the mounting rail assembly 2, the mounting rail assembly 2 includes attachment means for attaching cables 17 or rigid transmission lines to the interior side of the outer walls 21, 22, 23.

The attachment means may be made of an insulating material. The attachment means may form spring or tongues for holding the cables 17 in between.

The attachment means of the first side wall 21 and the attachment means of the second side wall 23 may also be configured to collaborate for fixing additional modules and additional parts in the interior of the mounting rail assembly 2. The attachment means may include recesses to interact with protruding elements on module case of the modules or vice versa for fixating the module within the mounting rail assembly 2.

The cross sectional view of FIG. 2 shows a wireless node module 7, 8, two cables 17, and plate-like part 31 attached within the interior of the mounting rail assembly 2.

The cables 17 may be at least one of signal cables, e.g. CAT network cables, mains supply lines such as electric cables for L, N, PE and GND lines for a mains supply, and DC power supply lines including VCC and GND lines for on or more DC supply voltages.

The plate-like part 31 may be made of an electrically conducting material, or at least be coated with an electrically conducting material. When inserted into the mounting rail assembly 2, the plate-like part 31 is essentially parallel to the top wall 22, Thus, an upper portion of the first side wall 21, the top wall 22, and an upper portion of the second side wall 23 cooperate with the plate-like part 31 to form an waveguide 3, in particular a rectangular waveguide 3.

A ratio of a diameter in left-right direction of the waveguide 3 to a diameter in top-down direction of the waveguide 3 may be 2 to 1 or vice versa. Thus, a hollow waveguide 3 is formed, which has the characteristic properties of such waveguide, in particular with respect to propagation modes of electromagnetic waves along the waveguide. The characteristics in particular include transmission frequency bands of the electromagnetic waves along the waveguide, which in particular depend on the inner dimensions, e.g. the two diameters of the rectangular cross section of the waveguide 3.

The plate-like part 31 may include a spring sheet or a HF stranded wire in order to provide an electrically conducting connection to the outer walls 21, 22, 23 of the mounting rail assembly 2.

The attachment means arranged attached to the top side wall 22 are preferably of an insulating material, e.g. a plastics material. The attachment means arranged attached to the top side wall 22 may be of a material that can be polarized by an applied electric field, and whose dielectric characteristics correspond to or are at least similar to the dielectric characteristics of free air.

The plate like part 31 has an aperture 32, which may be of slot-like structure of slot length of about $\lambda/2$, wherein $\lambda$ is the wavelength of the transmission frequency $f_c$ of the wireless signal. The transmission frequency $f_c$ may be the center frequency of the frequency band the wireless node module 7, 8 use for transmitting and receiving wireless signals.

The aperture 32 enables wireless signals external to stimulate at least one transmission mode of an electromagnetic wave inside the waveguide 3. Reciprocally, the transmission mode of an electromagnetic wave inside the waveguide 3 may radiate via the aperture 32 a wireless signal to the exterior of the waveguide 3.

The cross sectional view of the mounting rail assembly 2 of FIG. 2 shows a single wireless node module 7, 8 attached in the interior of the mounting rail assembly 2. The wireless node module 7, 8 may be either the first wireless node module 7 or one of the at least one second wireless node modules 8. The wireless node module 7, 8 has an antenna 18. The wireless node module 7, 8 receives and transmits wireless signals via the antenna 18. The antenna 18 is located at a predefined position relative to the aperture 32, when both the plate-like structure 31 and the wireless node module 7, 8 are arranged attached to the mounting rail assembly 2.

The antenna 18 has a radiation characteristic, which transmits and receives a first portion of the wireless signal towards the aperture 32. Therefore, the wireless node module 7, 8 transmits and receives a wireless signal via the waveguide 3.

The antenna 18 has a radiation characteristic, which transmits and receives a second portion of the wireless signal towards the opening 24. Therefore, the wireless node module 7, 8 transmits and receives a wireless signal to and from other wireless devices located in the environment of the mounting rail assembly 2.

The wireless node module 7, 8 may obtain its power supply via cables 17 arranged in the mounting rail assembly 2.

Figure 3:
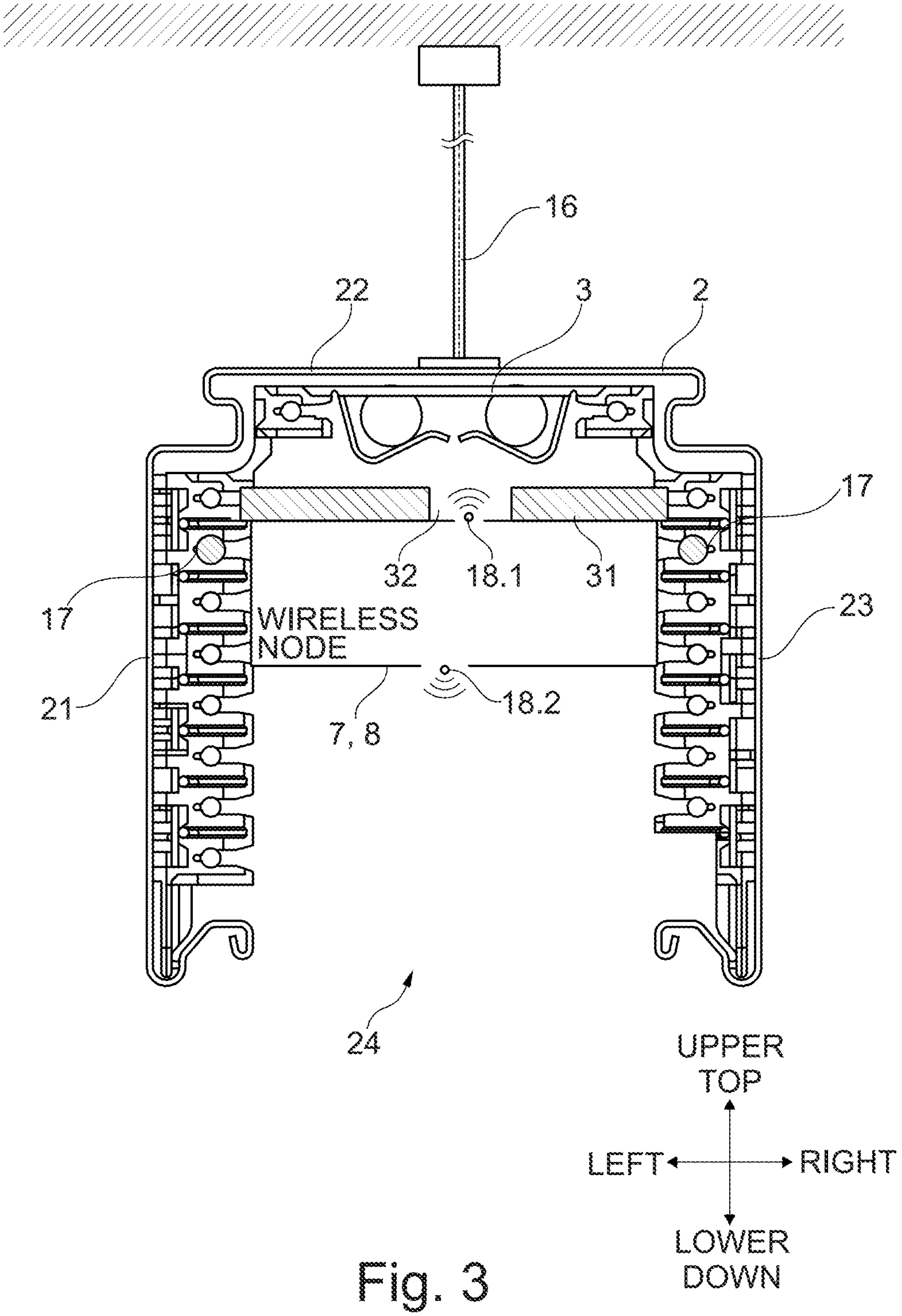
FIG. 3 shows a cross sectional view of a mounting rail assembly of a second embodiment.

FIG. 3 shows a cross sectional view of a mounting rail assembly 2 of a second embodiment.

The mounting rail assembly 2 of FIG. 3 corresponds in most aspects to the mounting rail assembly 2 discussed with reference to FIG. 2. The mounting rail assembly 2 has the plate-like structure 31 attached in order to form the waveguide 3. The mounting rail assembly 2 further includes the wireless node module 7, 8, which in case of FIG. 3 has a different antenna configuration compared with the first embodiment.

The wireless node module 7, 8 depicted in FIG. 3 has an antenna array (antenna cluster) comprising a first antenna 18.1 and a second antenna 18.2. The first antenna 18.1 is optimized for transmitting and receiving the wireless signal to and from the aperture 32. The second antenna 18.2 is optimized for transmitting and receiving the wireless signal to and from the opening 24. Using separate first and second antennas 18.1, 18.2 enables to optimize the first and second antennas 18.1, 18.2 separately for their respective task with regard to their respective location relative to the opening 24 and the aperture 32, and their respective radiation characteristic (radiation pattern).

The radiation characteristic may be optimized with respect to their radiation direction and the antenna gain in dependence of the radiation direction.

Figure 4:
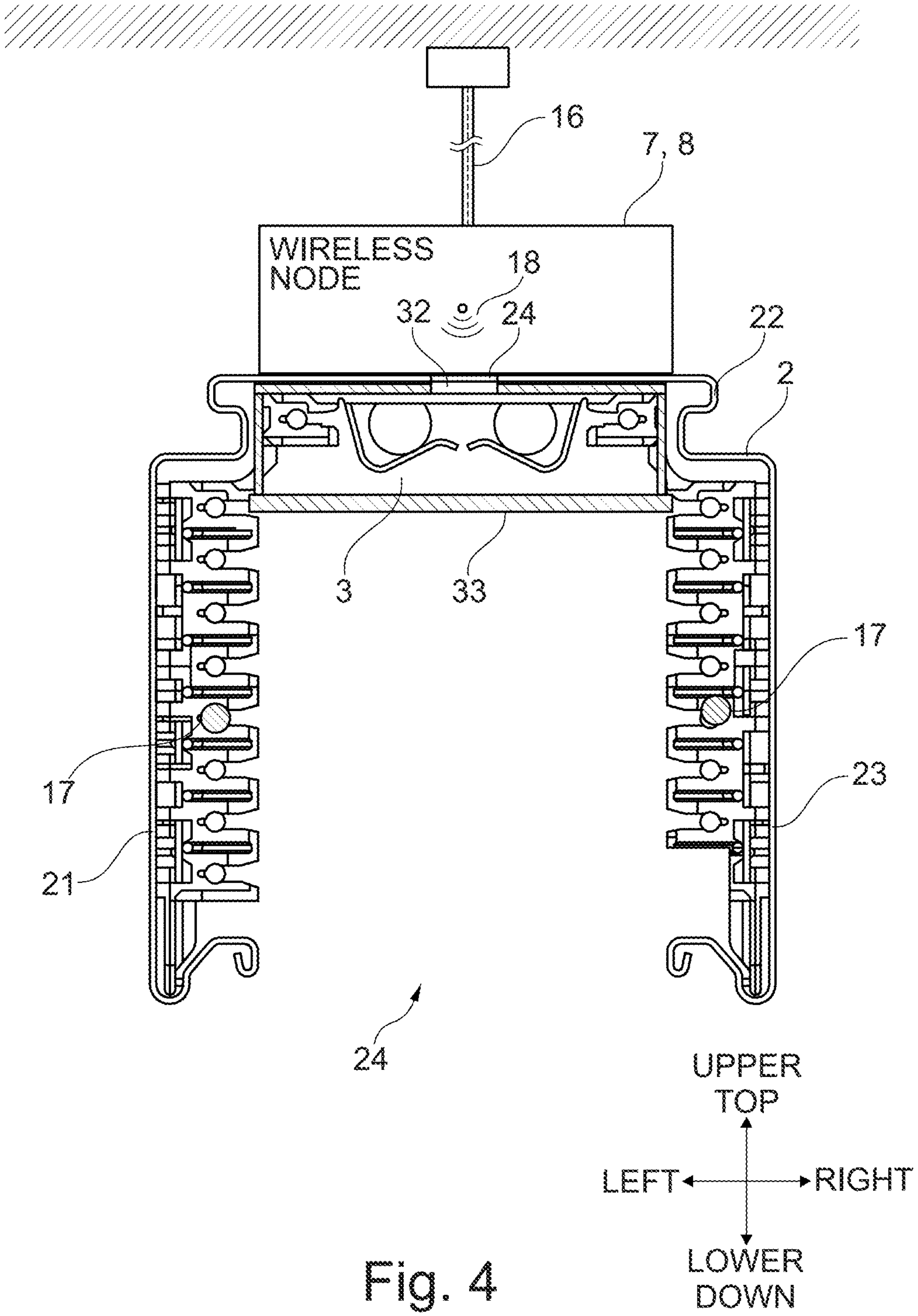
FIG. 4 shows a cross sectional view of a mounting rail assembly of a third embodiment.

FIG. 4 shows a cross sectional view of the mounting rail assembly 2 of a third embodiment.

The mounting rail assembly 2 of FIG. 4 corresponds in many aspects to the mounting rail assembly 2 discussed with reference to FIG. 2. The mounting rail assembly 2 shows the waveguide 3 attached to the interior of the mounting rail assembly 2.

Instead of the plate-like structure 31 of the first embodiment and the second embodiment, the waveguide 3 includes a waveguide module 33 inserted into the mounting rail assembly 2. The waveguide module 33 of FIG. 4 replaces the attachment means of the top wall 22. This provides a particular homogenous waveguide 3 with well propagation characteristics for electromagnetic waves within. The waveguide module 33 may be designed specifically for propagation modes required for guiding the wireless signal in the waveguide 3 and waveguide module 33. As the waveguide module 33 is designed as a closed structural component, no additional measures for sealing the walls of the waveguide 3 are necessary.

The third embodiment attaches the wireless node module 7, 8 on the outside surface of the top wall 22 of the mounting rail assembly 2. Arranging the wireless node module 7, 8 according to the third embodiment provides a particular wide coverage for the wireless signal towards the environment of the mounting rail assembly 2.

Arranging the wireless node module 7, 8 according to the third embodiment may benefit from using the ceiling of a room as reflector for achieving a wide radiation coverage of the wireless signal.

Arranging the wireless node module 7, 8 according to the third embodiment provides the further effect that luminaires 14 or other modules attached below or within the lower portion of the interior of the mounting rail assembly do not interfere with the radiation pattern of the antenna 18 of the wireless node module 7, 8.

The third embodiment shows the wireless node module 7, 8 with an antenna 18. Alternatively, the wireless node module 7, 8 of the third embodiment may have an antenna array with a plurality of antennas 18.1, 18.2 or individual radiating elements as discussed with reference to FIG. 3.

The waveguide module 7, 8 radiates at least a portion of the wireless signal towards the upper side of the top wall 22 of the mounting rail assembly 2. The top wall 22 of the mounting rail assembly 2 of the third embodiment includes a prefabricated aperture 24. When installing the wireless node module 7, 8, in a particular immediately before attaching the waveguide module 7, 8 on top of the mounting rail assembly 2, the prefabricated aperture 24 is opened. The prefabricated aperture 21 corresponds to the aperture 32 of the waveguide module 33 of the third embodiment in location and its dimensions. Therefore, a portion of the wireless signal transmitted or received by the waveguide module 7, 8 is coupled into, or coupled out of the waveguide 3.

Figure 5:
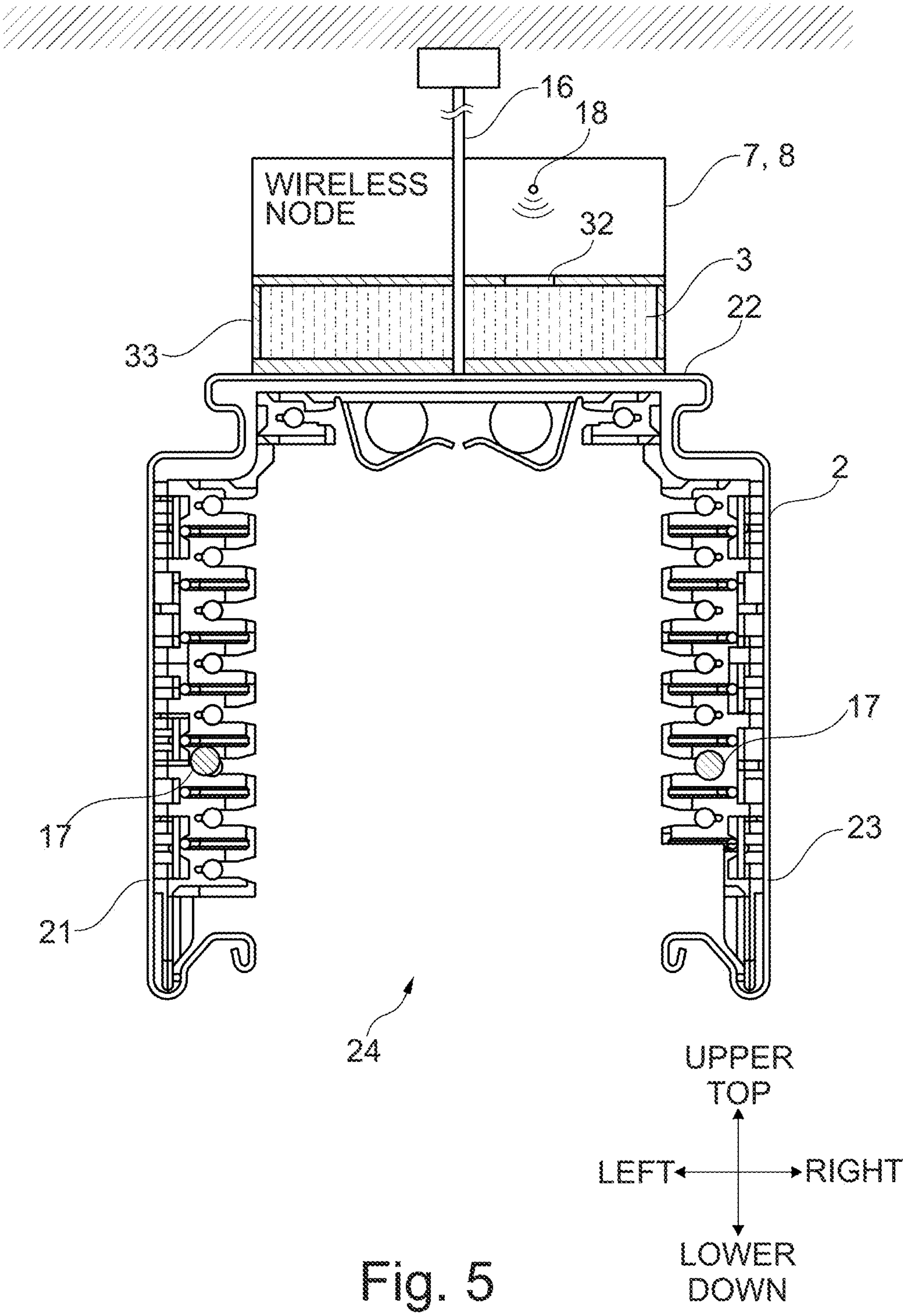
FIG. 5 shows a cross sectional view of a mounting rail assembly of a fourth embodiment.

FIG. 5 shows a cross sectional view of the mounting rail assembly 2 of a fourth embodiment.

The mounting rail assembly 2 of FIG. 5 corresponds in many aspects to the mounting rail assembly 2 discussed with reference to FIG. 4. The mounting rail assembly 2 shows the waveguide 3 arranged to the exterior of the mounting rail assembly 2. Similar to the third embodiment, the waveguide 3 includes a waveguide module 33. This provides a particular homogenous waveguide 3 with good propagation characteristics for electromagnetic waves within the waveguide 3. The waveguide module 33 may be designed specifically for propagation modes required for guiding the wireless signal in the waveguide 3 and the waveguide module 33. As the waveguide module 33 is designed as closed structural component, no additional measures for sealing the walls of the waveguide 3 are necessary.

The fourth embodiment attaches the wireless node module 7, 8 on the top surface of the waveguide module 33, which is in turn attached directly on the outside surface of the top wall 22 of the mounting rail assembly 2. Arranging the wireless node module 7, 8 according to the fourth embodiment provides a particular advantageous coverage for the wireless signal towards the environment of the mounting rail assembly 2 similar to the third embodiment.

Arranging the wireless node module 7, 8 according to the fourth embodiment may draw further benefits from using the ceiling of a room as reflector for achieving a wide radiation coverage of the wireless signal.

Arranging the wireless node module 7, 8 according to the fourth embodiment provides also the effect that luminaires 14 or other modules attached below or within the lower portion of the interior of the mounting rail assembly do not interfere with the radiation pattern of the antenna 18 of the wireless node module 7, 8.

The fourth embodiment shows the wireless node module 7, 8 with the single antenna 18. Alternatively, the wireless node module 7, 8 of the fourth embodiment may have an antenna array with a plurality of antennas 18.1, 18.2 or individual radiating elements as discussed with reference to FIG. 3.

The waveguide module 7, 8 radiates at least a portion of the wireless signal towards the upper side of waveguide module 33 attached to the top wall 22 of the mounting rail assembly 2. The position of the antenna 18 and the directional radiation pattern of the antenna 18 ensure that a portion of the wireless signal transmitted and/or received by the waveguide module 7, 8 is coupled into, or coupled out of the waveguide 3 via the aperture 32 arranged in the upper outside wall of the waveguide module 33.

The mounting rail assembly 2 of the fourth embodiment may therefore dispense with the prefabricated aperture 24 in the top wall 22 of the mounting rail assembly 2 of the third embodiment. In case of the fourth embodiment, an on-site installation of the waveguide module 33 and the wireless node module 7, 8 is simplified when compared with the third embodiment.

Figure 6:
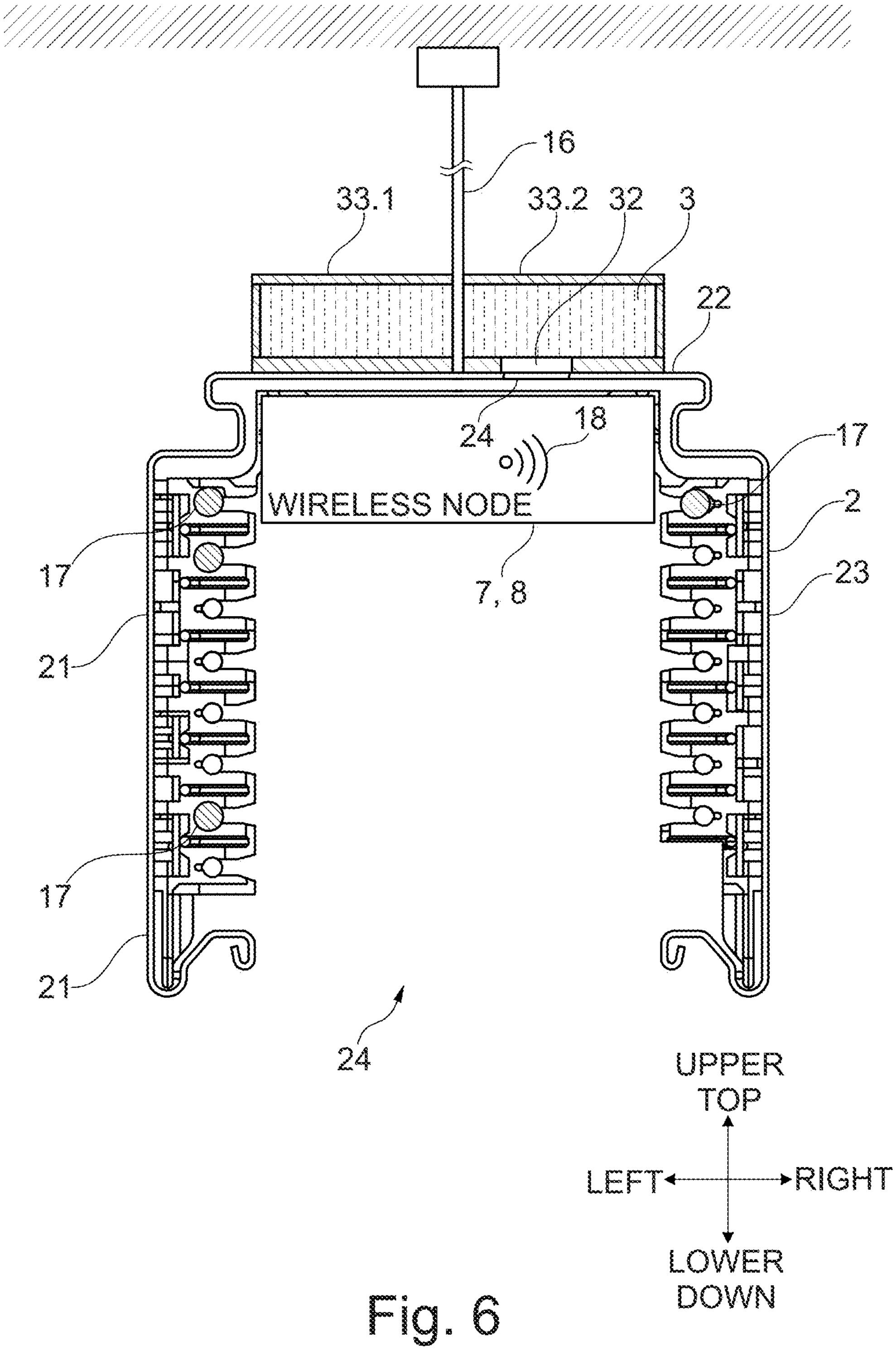
FIG. 6 shows a cross sectional view of a mounting rail assembly of a fifth embodiment.

FIG. 6 shows a cross sectional view of the mounting rail assembly 2 of a fifth embodiment.

The mounting rail assembly 2 of FIG. 5 corresponds in many aspects to the mounting rail assembly 2 discussed with reference to FIG. 5. The mounting rail assembly 2 shows the waveguide 3 attached to the exterior of the mounting rail assembly 2. Similar to the fourth embodiment, the waveguide 3 includes a waveguide module 33. The fifth embodiment attaches the waveguide module 33 directly on the outside surface of the top wall 22 of the mounting rail assembly 2.

The waveguide module 33 comprises a first waveguide module portion 33.1 and a second waveguide module portion 33.2. The first waveguide module portion 33.1 and the second waveguide module portion 33.2 may be fit together to constitute the waveguide module 33. An upper wall of the waveguide module 33 and a lower wall of the waveguide module 33 each have a hole for the suspension 16. The suspension 16 extends through the upper hole in the upper wall of the waveguide module 33 and the lower hole in the lower wall of the waveguide module 33. The waveguide module 33 is divided into the first waveguide module portion 33.1 and the second waveguide module portion 33.2 along a plane extending through the upper hole in the upper wall of the waveguide module 33 and the lower hole in the lower wall of the waveguide module 33. Thus when mounting the waveguide module 33 on the top wall 22 of the mounting rail assembly 2, the first waveguide module portion 33.1 and the second waveguide module portion 33.2 are joined together in order to fit around the suspension 16.

Preferably, the suspension 16 consists of an electrically isolating material, in order to reduce adverse effects on the propagation of electromagnetic waves in the waveguide 3.

The fifth embodiment of the mounting rail assembly arranges the wireless node module 7, 8 in the interior of the mounting rail assembly 2, preferably directly adjacent to and below the inner surface of the top wall 22 of the mounting rail assembly 2

The waveguide module 7, 8 radiates at least a portion of the wireless signal towards the inner surface of the top wall 22 of the mounting rail assembly 2. The top wall 22 of the mounting rail assembly 2 of the fifth embodiment includes the prefabricated aperture 24. When installing the wireless node module 7, 8, in a particular immediately before attaching the waveguide module 7, 8 in the interior of the mounting rail assembly 2, the prefabricated aperture 24 is opened. The prefabricated aperture 21 corresponds to the aperture 32 of the waveguide module 33 of the fifth embodiment in location and has corresponding dimensions. Therefore, a portion of the wireless signal transmitted or received by the waveguide module 7, 8 is coupled into, or coupled out of the waveguide 3 via the opened prefabricated aperture 24 and the aperture 32.

Power supply of the wireless node module 7, 8 of the fifth embodiment may be implemented using the cables 17 attached to the inner surfaces of the first and second side walls 21, 22, and does accordingly not require additional cabling.

Figure 7:
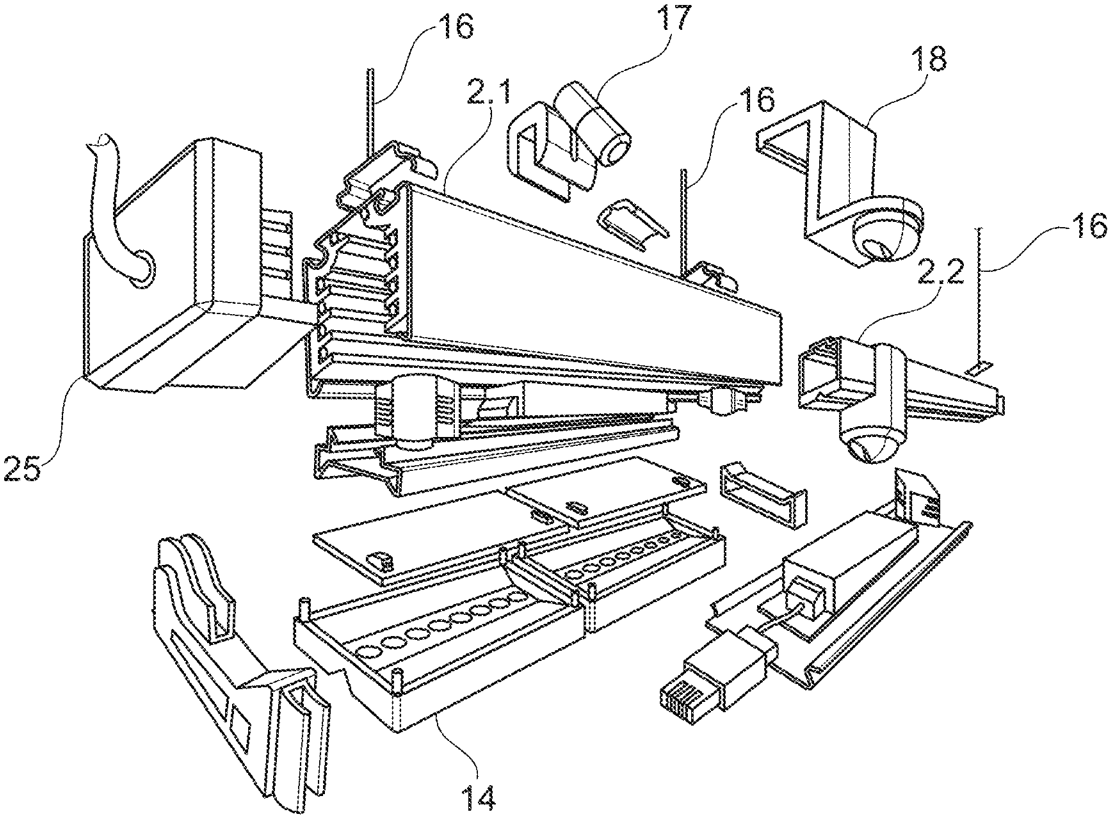
FIG. 7 illustrates elements of a lighting system, which center around an mounting rail assembly.

FIG. 7 illustrates elements of the lighting system 1, designed around a mounting rail assembly 2.

The mounting rail 2 may comprise a plurality of mounting rail sections 2.1, 2.2. The individual mounting rail sections 2.1, 2.2 may be joined together via coupling means providing a rigid mechanical connection and further comprising connectors for electrically connecting cables 17 of the mounting rail sections 2.1, 2.2. A mounting rail end cap 23 may include passages and/or sockets for electrically connecting mains power supply or communication lines. The mounting rail end cap 23 may also include termination resistors for electrically terminating the waveguide 3.

The mounting rail assembly 2 may further include luminaires 14 attached to and covering the lower opening 24 of the mounting rail assembly 2. The lighting system 1 may also include further luminaires, e.g. spotlights 17 attached to the side walls 21, 23, or attached to the top wall 22 using saddle-type attachment means.

The lighting system 1 may also include other types of modules, e.g. sensor modules such as camera modules or presence detecting modules 18 attached to the exterior surfaces of the mounting rail assembly 2.

Figure 8:
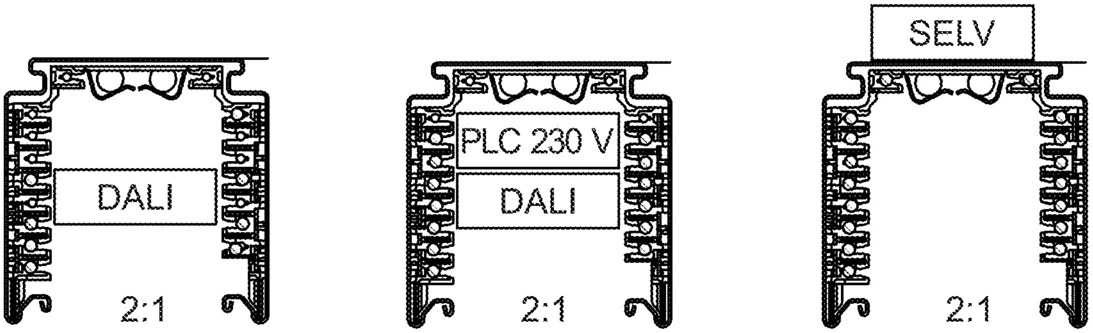
FIG. 8 illustrate cross sections through mounting rail assemblies illustrating different versions for a lighting system, which center around the mounting rail assembly.

FIG. 8 illustrate three different cross sections through mounting rail assemblies illustrating different versions for a lighting system 1 designed around a mounting rail assembly 2. FIG. 8 illustrates in particular that the mounting rail assembly enables an advantageous modular design and sequential upgrade from a basic variant of the mounting rail assembly 2, which includes a DALI module attached in the interior of the mounting rail assembly 2, to a more elaborate variant of the mounting rails assembly 2, which adds a power line connection module (PLC module) in the center portion of FIG. 8, to a sophisticated version, which includes further network cables and an attached SELV module on the outer surface of the top wall 22 of the mounting rail assembly.

The mounting rails assembly 2 including the waveguide 3 enables to provide a communication network for the lighting system 1, which further enhances the capabilities by an improved communication capability in return for only moderate cost, in particular avoiding the cost for additional wired cabling or additional wireless repeaters.

The invention claimed is:

1. A lighting system comprising a mounting rail assembly comprising mechanical mounting fixtures for lighting modules, other system modules and/or lighting control modules;

a first wireless node module having a first antenna or antenna array;

a second wireless node module having a second antenna or antenna array, and a waveguide attached to an upper wall of the mounting rail assembly and configured to guide wireless signals between the first wireless node module and the second wireless node module;

wherein the waveguide has a first aperture at a first location on the waveguide and a second aperture at a second location on the waveguide, the first wireless module is mounted externally to the waveguide such that at least a portion of the wireless signal transmitted and/or received by the first antenna or first antenna array is coupled out or coupled into the waveguide via the first aperture, and the second wireless module is mounted externally to the waveguide such that at least a portion of the wireless signal transmitted and/or received by the second antenna or second antenna array s is coupled out or coupled into the waveguide via the second aperture; and further wherein the waveguide is a closed electromagnetic waveguide between the first wireless node module and the second wireless node module.

2. The lighting system according to claim 1, wherein the waveguide has an upper hole in the upper wall of the waveguide and a lower hole in a lower wall of the waveguide to accommodate a pendant cord for suspending the mounting rail assembly to a ceiling, the waveguide is divided into a first waveguide module portion and a second waveguide module portion along a plane extending through the upper hole and the lower hole, and the a first waveguide module portion and a second waveguide module portion are joined together to fit around the pendent cord.

3. The lighting system according to claim 2, wherein the mounting rail is configured to be suspended from a ceiling.

4. The lighting system according to claim 1, wherein the mounting rail assembly has an essentially U-shaped cross section.

5. The lighting system according to claim 1, wherein the waveguide comprises at least one termination element arranged at an end portion of the waveguide, wherein the at least one termination element is configured to attenuate electromagnetic waves.

6. The lighting system according to claim 1, wherein the first and second apertures are prefabricated.

7. The lighting system according to claim 6, wherein the first and second apertures have a dimension corresponding to half a wavelength of the wireless signals.

8. The lighting system according to claim 1, wherein the first and second wireless modules are mounted on an upper wall of the waveguide, and the first and second apertures are through the upper wall of the waveguide.

9. The lighting system according to claim 1, wherein the first and second wireless modules are mounted inside the mounting rail assembly and the first and second apertures are through a lower wall of the waveguide, and a top wall of the mounting rail assembly comprises a first corresponding aperture and a second corresponding aperture that correspond in location and dimension to the first and second apertures through the lower wall of the waveguide.

10. The lighting system according to claim 1, wherein the waveguide has electrically conducting walls, an approximate rectangular cross section and is hollow or filled with a dielectric material.

* * * * *